United States Patent [19]
Yu

[11] Patent Number: 5,621,204
[45] Date of Patent: Apr. 15, 1997

[54] LOW POWER BAR CODE READER

[75] Inventor: Daming Yu, Cresskill, N.J.

[73] Assignee: Opticon Inc, Orangeburg, N.Y.

[21] Appl. No.: 453,914

[22] Filed: May 30, 1995

[51] Int. Cl.⁶ .................................................. G06K 7/10
[52] U.S. Cl. .................................................. 235/462
[58] Field of Search ................................ 235/462, 472,
235/463, 455, 454; 250/568, 551, 214 A

[56] References Cited

U.S. PATENT DOCUMENTS

| | | | |
|---|---|---|---|
| 3,886,328 | 5/1975 | Harms, Jr. et al. | 235/462 |
| 3,892,974 | 7/1975 | Ellefson et al. | 235/472 X |
| 4,288,701 | 9/1981 | Hill | 235/462 X |
| 4,517,455 | 5/1985 | Benitez, III et al. | 235/472 X |
| 4,521,678 | 6/1985 | Winter | 235/462 X |
| 4,608,487 | 8/1986 | Awane et al. | 235/462 X |
| 4,705,939 | 11/1987 | Ulinski, Sr. | 235/462 X |
| 4,779,104 | 10/1988 | Lawrence et al. | 235/462 X |
| 4,870,262 | 9/1989 | Hasegawa | 235/462 |
| 5,357,094 | 10/1994 | Baldwin | 235/462 X |

FOREIGN PATENT DOCUMENTS

| | | | |
|---|---|---|---|
| 63-054685 | 3/1988 | Japan | 235/462 |
| 63-085886 | 4/1988 | Japan | 235/462 |

*Primary Examiner*—Donald T. Hajec
*Assistant Examiner*—Jeffrey R. Filipek
*Attorney, Agent, or Firm*—Henry I. Schanzer

[57] ABSTRACT

A bar code reader has a light emitting source for illuminating a bar code, a photosensing element for sensing the light reflected from the bar code and an amplifier having an input to which the photosensing element is coupled. A single series path is employed to generate a current which is used to operate the light emitting element and to produce a bias voltage to bias the amplifier at a predetermined level. Using the same current to drive the light emitting element and to develop the bias voltage reduces the power consumed to operate the bar code reader.

12 Claims, 3 Drawing Sheets

LOW POWER BAR CODE READER

This invention relates to bar code readers and in particular to bar code readers with low power dissipation.

Bar code readers include a source of light and means for projecting light from the light source onto a bar code to illuminate the bar code. Bar code readers also include means for sensing light reflected from a bar code being illuminated, which sensing means include photosensor for sensing the amount of light reflected. FIG. 1 shows a bar code reader of the type known in the art as a "wand". The "wand" in FIG. 1 has a light source which is shown as a single light emitting diode (LED), designated as D1, and a photosensor which is shown as a single photodiode (PD), designated as D2. Elements D1 and D2 are operated by, and as part of, electronic circuitry shown in block 3. Typically, each one of these elements (i.e., the LED and the PD) has its own bias circuit for controlling the current or voltage applied across the element.

This is best explained with reference to a prior art circuit shown in FIG. 2 which shows an LED (D1) and a PD (D2) and circuitry associated with these elements to control their current and voltage levels. FIG. 2 includes a first circuit 10 for biasing the LED D1, and a second circuit 20 for developing the bias voltage (VB) for biasing an operational amplifier A1 intended to amplify the signal current generated by photodiode D2. Circuit 10 includes a resistor RB1 connected between a first power terminal 12 and a node 14 and LED D1 connected between node 14 and ground terminal 16. The value of resistor RB1 determines the current through D1 and the amount of light produced by D1. By way of example, where VDD applied to terminal 12 is 5 volts and where D1 when biased into conduction has a forward voltage drop (VF) of 1.6 volt and where (in a low power application) it is desired to pass a current of 1.1 milliamperes through D1 to obtain the desired illumination level, the value of RB1 would be in the range of 3000 ohms.

In FIG. 2, bias circuit 20 includes a resistor RB2 connected between terminal 12 and a node 18 and a zener diode Z1 connected between node 18 and ground terminal 16. The voltage VB developed at node 18 is applied to the anode of photodiode D2 and to the positive (+) input terminal 23 of an operational amplifier A1. Amplifier A1 may be any one of a number of known operational amplifiers having positive (+) and negative (−) input terminals and an output terminal, and which is operable with power supply voltages ranging from about 3 volts to more than 5 volts. The cathode of D2 is connected to the negative (−) input terminal 22 of A1. A feedback network comprised of the parallel combination of a resistor RF1 and a capacitor CF1 is connected between the output terminal 26 of A1 and the negative input terminal 22 of A1. As connected and operated, photodiode D2 functions as a signal current generator connected across the signal input terminals of amplifier A1.

In response to light reflected from a bar code, the photodiode D2 conducts a current proportional to the light incident on D2. This current tends to flow through the feedback network (RF1, CF1) and causes the voltage at the output terminal 26 to go more positive when more current flows through the diode and the feedback network. In the absence of any current signal from the photodiode D2, the bias voltage, VB, applied to positive (+)input terminal 23 of A1 is approximately equal to the value of Eo1 at the output terminal 26 of A1. The bias voltage VB thus sets the steady state or quiescent value of the voltage at the output of operational amplifier A1. For A1 to have maximum dynamic range it is desirable that, for the zero signal current condition through photodiode D2, amplifier A1 should be biased so that its input and output are at or close to VDD/2, where VDD is the power supply voltage.

In FIG. 2, to bias amplifier A1 at a desired bias level, VB, a zener diode Z1 is selected which has a zener voltage which is approximately equal to the value of VB. However, in order to maintain the zener diode in a condition where its zener voltage is stable over a relatively wide current range of operation, the zener diode must be biased with a relatively large current. Assume for example that the zener current in FIG. 2 is set at approximately 1 milliampere for a low power application. For such a case and where VDD is 5 volts the resistor RB2 would have a value of approximately 2400 ohms. As a result of biasing the zener at a preferred level for achieving a desired operating condition, the power dissipation of the biasing circuit is 5 milliwatts which is approximately equal to the power dissipation in the light generating circuit.

Thus, in the circuit of FIG. 2 there is significant power dissipation through the path defined by RB1 for LED D1 and there is significant additional dissipation in the path defined by RB2, for biasing the circuitry responsive to the reflected bar code signal.

Power dissipation is a problem of considerable importance when it is desired that the bar code reader be operated from a battery. The battery life is directly related to the amount of power consumption.

Accordingly, it is an object of this invention to reduce the power consumed by, and in, a bar code reader.

SUMMARY OF THE INVENTION

Applicant's invention resides, in part, in the recognition that the circuit for biasing the light emitting section may be combined with the circuit for biasing the photosensing section to effectuate a saving in power and in the number of components needed to form a bar code reader.

Accordingly, circuits embodying the invention include a series path comprising means connected in series with a light emitting element for controlling the current through it and means for deriving a bias voltage at a point along the series path. The bias voltage is used bias an amplifier at a preferred level, where the amplifier is designed to amplify signals generated by a photosensing element.

A bar code reader embodying the invention includes first and second power terminals for the application therebetween of an operating potential, a light emitting element for illuminating a bar code and a light sensing element responsive to the light reflected from said bar code coupled to the signal input of an amplifier. Means are coupled in series with the light emitting element between the first and second power terminals for controlling the amplitude of the current through the light emitting element and for producing a bias voltage which is coupled to the signal input of the amplifier. The value of the bias voltage is selected to bias the amplifier at a level tending to optimize its response to the signals generated by the light sensing element.

In a particular embodiment of the invention, a resistor is connected in series with a light emitting diode (LED) and a zener diode between two power terminals. The same series current flows through the LED and the zener diode for powering the LED and for establishing a reference voltage across the zener diode. The reference voltage is applied to the input of an OP-AMP to bias the OP-AMP at a preselected level to optimize the response of the amplifier to a photodiode connected to the input of the OP-AMP, where the photodiode produces a current in response to light from the LED.

BRIEF DESCRIPTION OF THE DRAWINGS

In the accompanying figures like reference characters denote like components.

DETAILED DESCRIPTION OF THE INVENTION

Figure 3:
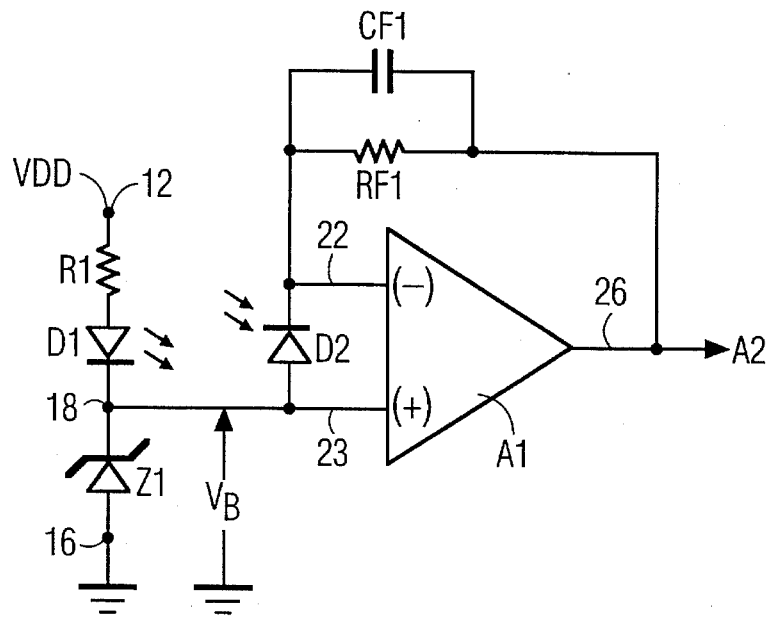
FIG. 3 is a schematic diagram of a circuit embodying the invention.

Referring to FIG. 3, there is shown a bias circuit in which the light emitting diode D1 and the photodiode D2 share the same bias circuit. A resistor R1 is connected between power terminal 12 and the anode of a light emitting diode D1. The cathode of diode D1 is connected to node 18 to which is connected the cathode of a zener diode Z1 and the anode of photodiode D2. The anode of Z1 is connected to ground potential at node 16. The cathode of diode D2 is connected to the negative (−) terminal 22 of an operational amplifier A1.

Assume that VDD applied to terminal 12 is 5 volts, and that the bias voltage should be set to approximately VDD/2. Then the diode Z1 selected for use in the circuit of FIG. 3, is selected to produce a voltage of 2.5 volts. Assume further that the light emitting diode D1 has a forward drop of 1.6 volts when conducting and that the requisite light level is produced when a current of 1.1 milliamperes flows through D1. For such a value of current the resistor R1 would be designed to have a value of approximately 820 ohms.

Figure 1:
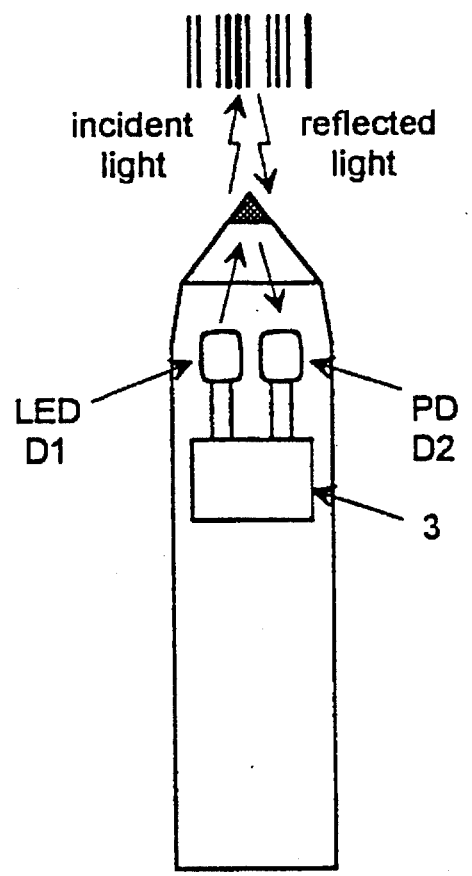
FIG. 1 is a simplified cross-sectional view of a wand type bar code reader suitable for use with the invention.
Figure 2:
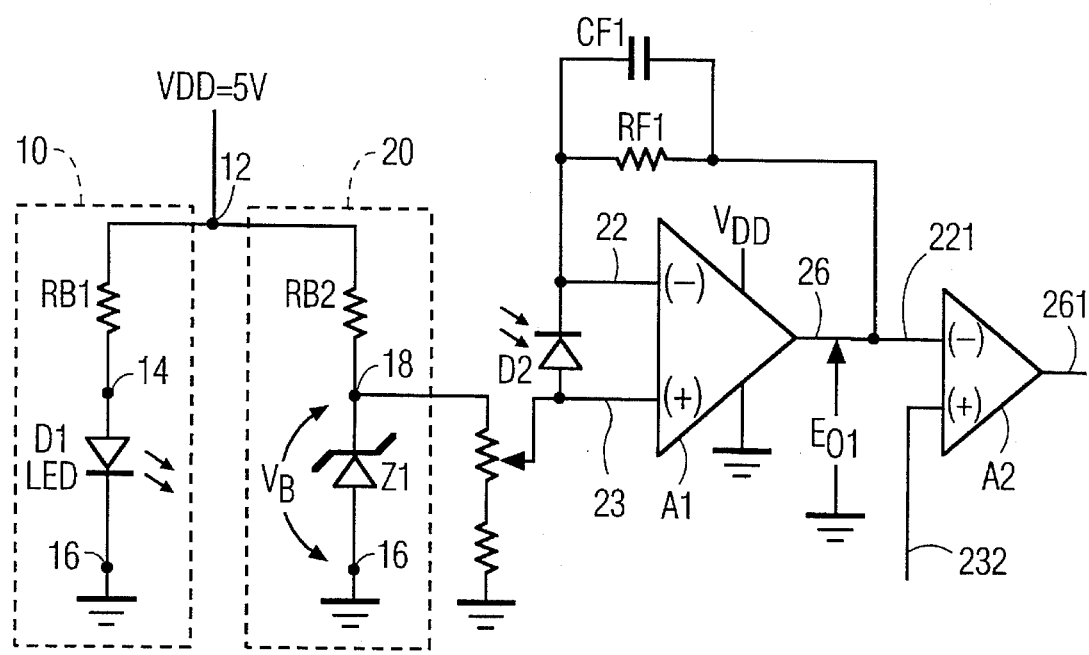
FIG. 2 is a schematic diagram of a prior art circuit.

Note that for the conditions just discussed the LED D1 supplies the same light level as in the prior art and the zener diode Z1 is biased to produce the same bias voltage. However, in comparison to the prior art circuit of FIG. 2, the power dissipation has been cut in half. In addition, the power saving is accomplished with one less component. That is, whereas the circuit of FIG. 2 required two resistors (i.e., RB1 and RB2), the circuit of FIG. 3 needs only one resistor (i.e., R1) to accomplish the same functions. Thus, in addition to a substantial saving in power consumption, there is saving in the number of required components.

Figure 4:
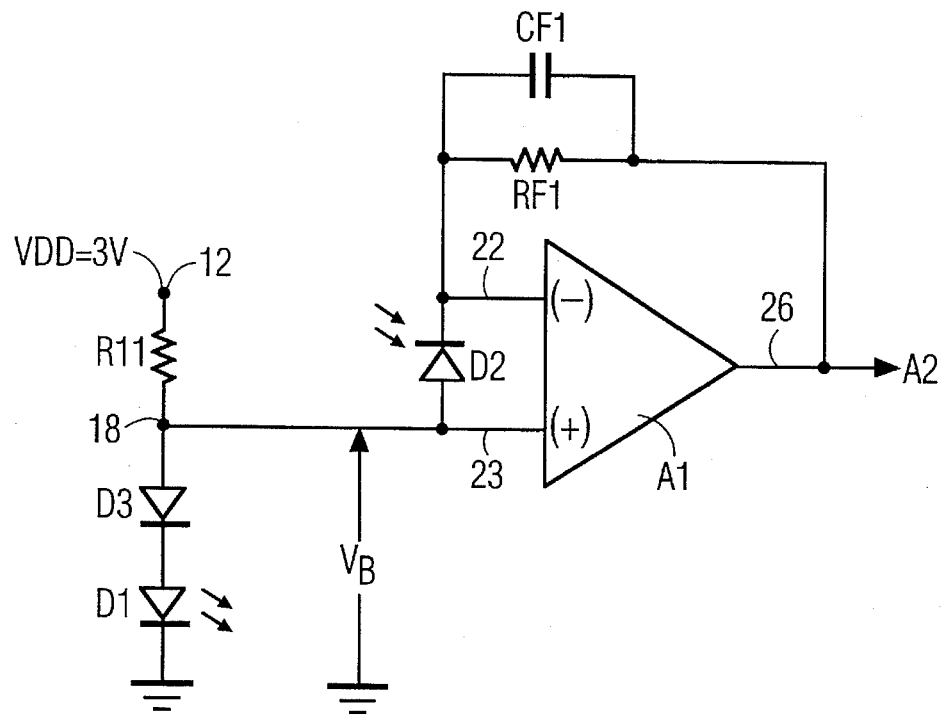
FIGS. 4 and 5 a chematic diagrams of other circuits embodying the invention.
Figure 5:
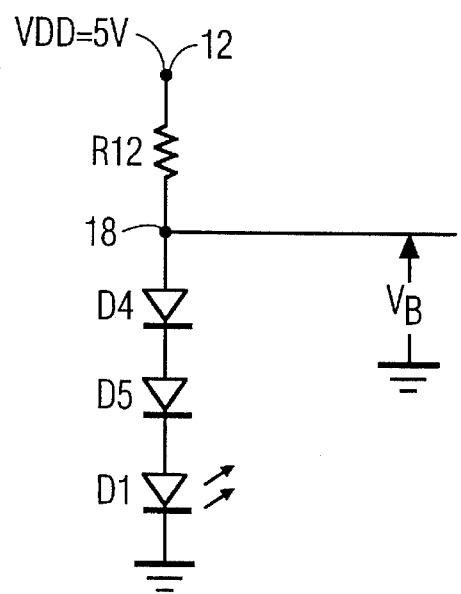

The circuit of FIG. 3 may be further modified as shown in FIGS. 4 and 5, where the light emitting diode D1, functions as a light emitting element and also to produce the bias voltage, obviating the need for a zener diode.

Referring to the circuit shown in FIG. 4 note that diode D1 is connected at its cathode to ground terminal 16 and at its anode to the cathode of a diode D3. Where VDD applied to the power terminal 12 is 3 volts and the bias voltage is desirably in the range of 1.5 to 2 volts, diode D3 is selected to be a schottky diode having a forward voltage drop of typically 0.3 volt. Thus where the forward drop of D1 is in the range of 1.6 volt, the sum of the forward voltage drops of diodes D1 and D3 will be approximately 1.9 volts. Note that where the bias voltage need not be set at a precise value, this arrangement is very satisfactory. Thus, in the circuit of FIG. 4, the need for zener diode which is relatively expensive has been eliminated in addition to the saving in power dissipation. It is important to note that Applicant recognized that the photodiode current from D2 flowing through D1 has very little effect on D1. This is based on the fact that the bias current through D1 is normally orders of magnitude greater than the signal photo current flowing through the photodiode D2. Hence, Applicant realized that a single bias circuit may be used to generate the current for the light emitter while providing the requisite bias voltage to operate the amplifier section of the bar code reader.

Note that in those applications where the bias voltage may be offset, the diode D3 could be eliminated and the LED D1 would then be the sole element needed to produce the required illumination and the bias level to operate the amplifiers for amplifying the light reflected onto the photodiode FIG. 5 shows that two silicon diodes (D4 and D5), each having a typical forward voltage drop of 0.7 volt, may be connected in series with diode D1 to produce a bias voltage of approximately 3.0 volts. The point is that various combination of different diodes may be used to allow a desired current to flow through the LED while at the same time producing a desired value of bias voltage which is then used to bias the amplifiers designed to amplify the photo signal current.

What is claimed is:

1. In a bar code reader including a light emitting source for illuminating a bar code and a photosensing element for detecting light reflected from the bar code, and including an operational amplifier (OP-AMP) having an inverting input terminal, a non-inverting input terminal and an output terminal, with the photosensing element being coupled between the input terminals of the OP-AMP, wherein a current is supplied to said light emitting source for causing it to emit light and wherein a bias voltage is generated and applied to an input terminal of said OP-AMP to bias it at a predetermined level to increase its dynamic range, the improvement comprising:

a single series path comprising a current limiting means connected in series with said light emitting source between first and second power terminals for supplying the current powering said light emitting source and including means for producing a relatively fixed bias voltage along the series path supplying current to the light emitting source and for applying the relatively fixed bias voltage via negligible impedance means to said non-inverting input terminal of said OP-AMP.

2. In a bar code reader as claimed in claim 1 wherein said light emitting source is a light emitting diode (LED) and wherein said photosensing element is photodiode; and wherein said photodiode is connected between the inverting and non-inverting input terminals of the OP-AMP, and wherein a feedback network is connected between the output terminal and the inverting input terminal of the OP-AMP.

3. In a bar code reader as claimed in claim 2 wherein said current limiting means is a resistive element connected between said first power terminal and an intermediate node;

and wherein said means for producing a relatively fixed bias voltage and for applying the bias voltage to said non-inverting input terminal includes means coupling said LED between said intermediate node and said second power terminal for establishing said bias voltage at said intermediate node and including negligible impedance means coupling said intermediate node to said non-inverting input terminal of said OP-AMP.

4. In a bar code reader as claimed in claim 2 wherein said current limiting means includes a resistive element connected in series with said LED between said first power terminal and an intermediate node; and wherein said means for producing a relatively fixed bias voltage and for applying the bias voltage to said non-inverting input terminal includes a zener diode connected between said intermediate node and said second power terminal and including negligible impedance means coupling said intermediate node to said non-inverting input terminal of said OP-AMP.

5. A bar code reader comprising:

first and second power terminals for the application therebetween of an operating potential;

a light emitting element for illuminating a bar code;

a light sensing element responsive to the light reflected from said bar code;

an amplifier having a signal input and a signal output;

means coupling said light sensing element to the signal input of said amplifier;

means including a resistor connected in series with said light emitting element between said first power terminal and an intermediate node and a zener diode connected between said intermediate node and said second power terminal for controlling the amplitude of the current through said light emitting element and for producing a bias voltage; and negligible impedance means coupling the intermediate node to the signal input of said amplifier for biasing it at a predetermined level.

6. In a bar code reader as claimed in claim 5, wherein said light emitting element is a light emitting diode (LED) and said light sensing element is a photodiode.

7. In a bar code reader as claimed in claim 6 wherein said means coupled in series with said light emitting element includes a resistor connected between said first power terminal and an intermediate node and means coupling said LED between said intermediate node and said second power terminal and further means coupling said intermediate node to said signal input of said amplifier.

8. In a bar code reader as claimed in claim 5, wherein said bias voltage is selected to have a value to bias the amplifier at a point to increase the dynamic range of the amplifier.

9. A bar code reader comprising:

first and second power terminals for the application therebetween of an operating potential;

a light emitting element for illuminating a bar code;

a light sensing element responsive to the light reflected from said bar code;

an amplifier having a signal input and a signal output;

means coupling said light sensing element to the signal input of said amplifier;

means including a resistor connected between said first power terminal and an intermediate node and means connecting said light emitting element between said intermediate node and said second power terminal for controlling the amplitude of the current through said light emitting element for producing a bias voltage; and negligible impedance means coupling the intermediate node to the signal input of said amplifier for biasing it at a predetermined level.

10. A bar code reader as claimed in claim 9 wherein said light emitting element is a light emitting diode (LED) and said light sensing element is a photodiode.

11. In a bar code reader as claimed in claim 10, wherein said means coupling said LED between said intermediate node and said second power terminal includes another diode connected in series with said LED.

12. A bar code reader as claimed in claim 10, wherein said amplifier is an operational amplifier and wherein said signal input of said amplifier includes inverting and non-inverting signal input terminals, and wherein said photodiode is coupled between said inverting and non-inverting signal input terminals; and wherein said amplifier includes a feedback network connected between said output of said amplifier and said inverting input terminal and wherein said bias voltage is coupled to the non-inverting input terminal of said amplifier.

* * * * *